Patented Jan. 5, 1954

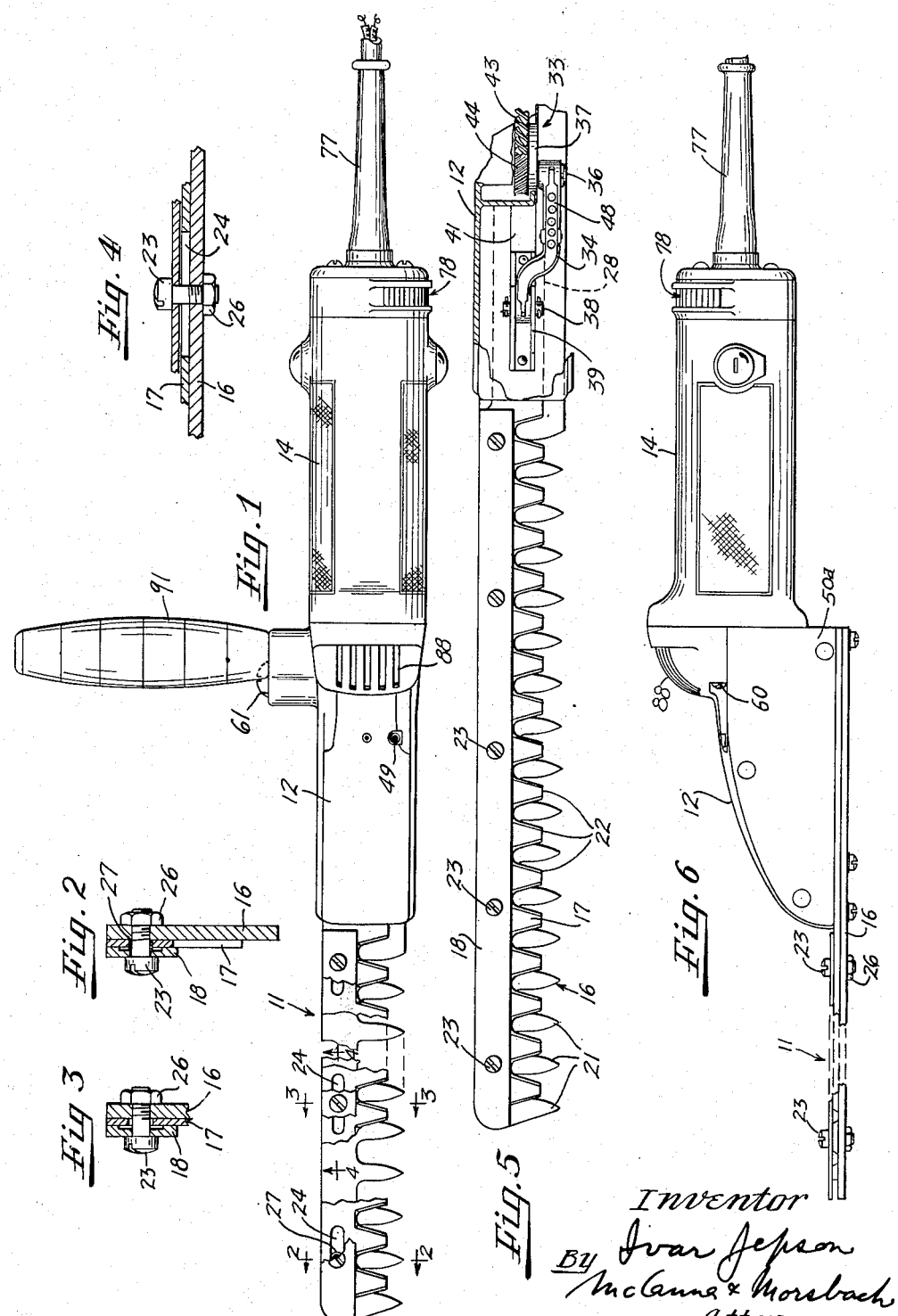

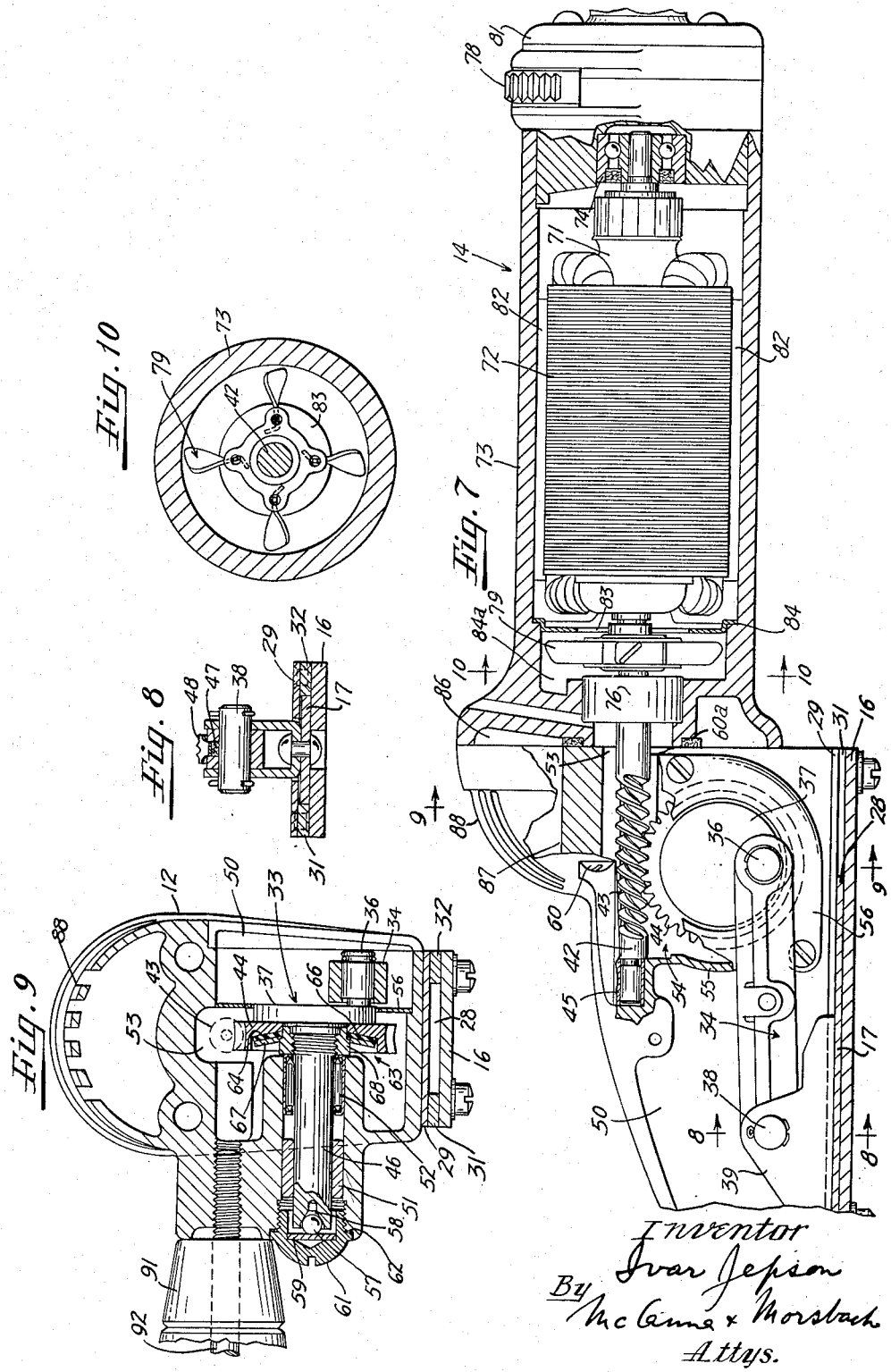

2,664,626

UNITED STATES PATENT OFFICE 2,664,626

HEDGE TRIMMER

Ivar Jepson, Oak Park, Ill., assignor to Sunbeam Corporation, Chicago, Ill., a corporation of Illinois Application February 16, 1948, Serial No. 8,579

4 Claims. (Cl. 30—123)

This invention relates to cutting mechanisms and more particularly to trimmers for hedges, small shrubs and the like.

Prior designs of hedge trimmers have been inadequate in many respects. For example, in cutting hedges and the like, frequently a rock, wire fence or the like will inadvertently get into the cutting mechanism of the trimmer. Heretofore when this has happened such an instantaneous overload has been placed on the motor driving the trimmer that it stalls and the moving parts of the trimmer such as in the driving connection between the motor and the cutting mechanism have been severely damaged due to inertia effects. If the motor were large enough to withstand the overload it would be so powerful that comb or blade teeth would be damaged under the above conditions and the trimmer would be greatly oversize. Another defect of previous designs is that they have been too large and heavy and have not been well balanced. Consequently they have been awkward and cumbersome to handle. It has been practically impossible to operate them by one hand with any degree of personal comfort and even with two hands after a short period of time the operator becomes tired and exhausted. Because of these defects prior designs of trimmers have not been altogether satisfactory.

An object of the invention is to provide a hedge trimmer of the above character with means for preventing mechanical damage to the working parts of the trimmer due to the inertia effects of the moving parts when a sudden overload is applied to the cutter mechanism.

Another object of the invention is to provide a hedge trimmer in which the component parts thereof are so balanced that the operator can use the trimmer for long periods of time without becoming fatigued.

Another object of the invention is to provide a hedge trimmer of the above character in which the motor for driving the trimmer is mounted in a handle of the trimmer.

Another object of the invention is the provision in a hedge trimmer of the above character in which the exhaust air of the motor is utilized to cool the connecting means transmitting the driving power of the motor to the cutting mechanism.

Another object of the invention is to provide a hedge trimmer of the above character having two handles, positioned so that the unit is so well balanced that the hedge trimmer may be held in an operating position with either or both of the handles.

Another object of the invention is to provide a cutter which is of light weight, which is simple and sturdy in construction and which is relatively inexpensive to manufacture.

Other objects and advantages of the invention will become apparent from the following detailed description taken in connection with the accompanying drawings, in which—

Figure 1 is a top plan view of a hedge trimmer embodying the present invention;

Fig. 2 is a sectional view taken substantially along the line 2—2 of Figure 1;

Fig. 3 is a sectional view taken substantially along the line 3—3 of Figure 1;

Fig. 4 is a sectional view taken substantially along the line 4—4 of Figure 1;

Fig. 5 is an enlarged view of the cutter mechanism similar to Figure 1;

Fig. 6 is a side elevation view of Figure 1;

Fig. 7 is an enlarged view similar to Fig. 6 with the working parts of the trimmer exposed;

Fig. 8 is a sectional view taken along the line 8—8 of Fig. 7;

Fig. 9 is a sectional view taken substantially along the line 9—9 of Fig. 7, and Fig. 10 is a sectional view taken substantially along the line 10—10 of Fig. 7.

Referring now to the drawings the invention is shown embodied in a trimmer for cutting hedges, small shrubs and the like. In general the trimmer comprises a cutting mechanism 11 mounted in a cantilever fashion on a forward end of a support or housing 12 and driven through means disposed in the housing by a motor 14 mounted in a cantilever fashion at the rearward end of the housing.

As shown in Figs. 1-6 the cutter mechanism comprises an elongated comb 16, a reciprocatably mounted cutting blade 17 slidably disposed on the comb and a pressure strip 18 for adjusting the tension between the blade 17 and the comb 16. At one end the comb is secured to the underside of the housing 12 in a rigid manner as by screws. The portion of the comb extending outwardly from the housing is formed with a plurality of equally spaced pointed teeth 21 along one edge. The blade 17 is also formed with a plurality of equally spaced triangular shaped teeth 22 and rests on the comb 16 so that during reciprocation of the blade 17 the teeth 22 of the blade coact with the teeth 21 of the comb to cut shrubs and the like received in the spaces between the comb teeth. The pressure strip 18 overlies the portion of the blade 17 interconnecting the base of the teeth 22 of the blade 17. The pressure strip is secured in position by screws 23 extending through the strip, elongated slots 24 formed in the blade 17 and threaded into the comb 16. The screws are positively retained in a desired adjusted position by lock nuts 26. The pressure between the blade 17 and the comb 16 may be readily adjusted by simply loosening or tightening the screws 23 as required. For best results the tension plate should be adjusted so that when the motor is stopped the blade will tend to oscillate several times before coming to a stop.

The blade 17 is guided in its movement at two points disposed on opposite ends of the blade. For this purpose the slot 24 at the outer end of the blade 17 is made slightly wider than the other slots 24 between the end of the blade and the housing 12 and a cutter guide bushing 27 is mounted on the screw 23. The bushing has approximately the same thickness as the blade and is so dimensioned that it fits between the side walls of the slot to permit reciprocation of the blade without binding of the parts. At its opposite end the cutter blade 17 is formed with an end portion 28 (see Fig. 5) shaped to slidably fit between the comb 16 and a guide plate 29 (see Fig. 9) and spacer plates 31 and 32 on opposite edges of the comb and separating the comb 16 from the guide plate 29. The latter is secured to the bottom of the housing 12 in a rigid manner as by screws. The above construction permits the blade to reciprocate freely and positively guides the blade during its reciprocatory motion.

In the present instance the blade 17 is reciprocated by a crank assembly 33 which converts the rotational motion of the motor 14 to a straight line movement in the blade. As best seen in Fig. 7 the crank assembly 33 is connected to the blade 17 through a link 34. The latter is pivotally mounted at one end on an eccentrically mounted pin 36 projecting axially outwardly from a disc 37 of the crank assembly. At its opposite end the link is pivotally mounted as by a pin 38 to a yoke 39 rigid with the blade 17 and projecting through an elongated slot 41 formed in the guide plate 29. The pivotal connections between the connecting link 34 and the yoke 39 and between the connecting link and the pin 36 are lubricated by a wick 47 secured to the top of the connecting link 34 by means of suitable retainer 48. Lubricant may be supplied to the wick through an opening 49 formed in the top of the housing 12 and overlying the connecting link 34. The pin 36, link 34 and yoke 39 are disposed in a compartment 50 at the forward end of the die cast or similar light weight material housing 12. Access to the compartment may be had by removing a cover 50a secured to the side of the housing as by screws.

The crank assembly 33 is driven by the motor 14 through a speed reduction unit in the form of a worm gear. To this end a shaft 42 of the motor is formed with a worm 43 shaped to drive a worm wheel 44 mounted on a shaft 46 of the crank assembly 33 integral with the disc 37 and extending transversely of the housing 12. The end of the shaft 42 is mounted in a bearing 45 suitably retained in the upper part of the housing. The crank shaft 46 (see Fig. 9) is supported by suitable bearings 51 and 52 retained in the housing 12 and positioned so that in the lower position of the connecting link as shown in Fig. 7 the center of the pin 36 is slightly above the center of the pin 38. It will be observed that with this construction the connecting link 34 slopes downward from the pin 36 to the yoke 39 and the forces for driving the blade 17 are applied at an angle inclined to the blade 17. The above positioning of the crank assembly 33 is advantageous in that none of the parts driving the blade 17 project below the plane of the blade. As best shown in Fig. 5 the ends of the connecting link 34 are offset with respect to each other so that the yoke 39, the motor shaft 42 and the worm wheel 44 are in substantially the same plane. This construction makes for compactness and maintains the driving forces of the mechanism in the same plane as the motor shaft 42.

Provision is made for assuming the thrust of the crank shaft 46. As best shown in Fig. 9 this is in the form of a ball bearing 57 received in a conical shaped recess 58 formed in the end of the shaft 46 and abutting against a disc 59 received in the cap 61 threaded into the housing 12. Where necessary a shim 62 may be disposed between the cap and the housing for adjusting the respective parts.

The worm gear is disposed in a compartment 54 formed in the housing adjacent the motor 14. Normally the compartment is filled with a lubricant such as grease so that the worm gear is properly lubricated at all times. Access to the compartment 54 is effected by first removing the side cover 50a and then removing a gasket plate 56 secured to a rib 55 and the sides of the housing forming the compartment, as by screws. The gasket is provided with an opening through which the disc 37 projects. The opening in the gasket is sufficiently large to permit rotation of the disc while at the same time coacting with the disc to retain grease in the compartment. Normally grease is supplied to the compartment through an opening 53 in the end of the housing and through which the shaft 42 projects. To this end the motor is readily removed from the housing by the removal of two screws 60 securing the motor to the housing. A gasket 60a normally prevents leakage of lubricant from the compartment into the motor.

One aspect of the invention is concerned with means for preventing mechanical damage to the component parts of the trimmer when the cutting mechanism is suddenly overloaded to a point where the motor stalls such as occurs when a nail or a piece of wire is inadvertently received in the cutting mechanism. To accomplish this in the present instance a clutch means 63 is disposed between the worm gear and the crank assembly 33 such that normally the worm wheel 44 is drivingly connected to the crank shaft 46 yet when a sudden load in excess of a predetermined overload is applied to the cutter mechanism, relative displacement takes place between the worm wheel 44 and the shaft 46. In this embodiment of the invention one side of the worm wheel 44 is shaped to abut against the disc 37 and the other side of the wheel is formed with a generally frusto-conical shaped surface 64 concentric with the shaft 46. A flat synthetic resin ring 66 abuts against the surface 64 and is retained in position by a spring disc 67 secured in position by a nut 68 screwed on the shaft 46. Normally the nut 68 is tightened sufficiently so that the clamping force acting between the disc 37 and the spring disc 67 maintains the worm wheel 44 in driving relation with the crank shaft 46. When the overload however exceeds the predetermined value there is slippage or yielding movement between the spring disc and the worm wheel due to the relative rotation of these parts with respect to the synthetic resin disc. In normal operation the overload condition of the above character will stall the motor and consequently the high stresses due to the inertia effects of the suddenly stopped motor last only for a short period of time. It is to be understood that the yielding action or relative displacement of the respective parts takes place only in the short period during which the overload exceeds the predetermined value. As soon as the stresses are reduced to a point below the predetermined value there is a positive driving connection between the crank assembly 33 and the worm wheel 44. By using the conical shaped surface in the worm wheel 44 a uniform pressure between the synthetic resin disc and the worm wheel 44 over the entire contacting surfaces between these members is assured. As a consequence extremely small parts may be utilized in the above construction.

The motor 14 is secured to the housing 12 at the end opposite the cutting mechanism 11 and is positioned to be secured to the housing at a point above the plane of the cutting mechanism. In general the motor is of a universal type and comprises an armature 71 mounted on the shaft 42 and a field structure 72 disposed in a casing 73. The shaft 42 is mounted on suitable bearings 74 and 76 at opposite ends of the shaft and retained in the casing 73. Power for the motor may be supplied through a suitable cord 77 adapted for connection to an external source of power. A switch 78 mounted in the end of the casing permits the operator to turn the motor off and on as required. The motor is cooled by a fan 79 mounted on the shaft 42 adjacent the bearing 76. With the motor in operation air is drawn into the motor casing 73 through a screen, not shown, held on the outer end of the motor by a cap 81. The air passes through passageways 82 formed in the casing, through an opening 83 in an air deflector plate 84 mounted in the casing adjacent the fan 79, through the fan chamber 84a, and a discharge chamber 86. The discharged air is relatively cool and in the present instance is utilized to reduce the temperature of the housing 12 and the worm gear mechanism. For this purpose the discharge air after leaving the chamber 86 is conducted through a passageway 87 overlying the top of the housing 12 adjacent the compartment 54 and is discharged through a grillwork 88 formed integral with the housing and abutting against the motor 14.

One aspect of the invention is to simplify the construction of the hedge trimmer, and coordinate the components thereof whereby the trimmer is so well balanced that an operator can utilize it for relatively long periods of time without becoming tired. Accordingly the motor casing 73 in the present instance has a generally circular cross section and is formed with light weight synthetic resinous material. The diameter of the casing is such that it can be readily held in the hand of an operator and consequently the casing is utilized as a handle for holding the trimmer. By utilizing the casing 73 of the motor in the above manner it is to be understood that the cutter mechanism 11, the housing 12 and the handle are in axial alinement. This provides a construction which is well balanced so that it may be held in an operating position for relatively long periods of time by one hand. As hereinbefore stated the motor is positioned so that it is above the plane of the cutter mechanism. It will be observed that by placing the motor in this manner the casing 73 is disposed so that the operator can readily grasp the handle. Although the above construction provides a readily operable trimmer adaptable for one hand usage it frequently is desirable to use both hands to hold the trimmer. Accordingly a second or auxiliary handle is provided for this purpose. In the present instance the auxiliary handle 91 is disposed at substantially right angles to the longitudinal axis of the motor 14, housing 12 and cutter mechanism 11. The handle 91 is secured to the housing as by a bolt 92 threaded into the side of the housing 12 at a position substantially corresponding to the center of gravity of the above mechanism. Preferably the handle is disposed on the side of the housing away from the direction in which the teeth 21 and 22 of the comb and cutter respectively face. The aforegoing construction provides a trimmer that is of light weight, is well balanced, and can be used for long periods without fatiguing the operator.

While I have shown one embodiment of my invention it will be understood that I do not wish to be limited thereto since many modifications may be made and I therefore contemplate by the claims to cover such modifications as fall within the true spirit and scope of my invention.

I claim:

1. In a trimmer for cutting hedges and the like, the combination of a support, a cutter mechanism mounted on said support, a motor mounted on said support having a shaft with a worm formed thereon, a crank assembly, a link connected between said crank assembly and said cutter mechanism for actuating the latter, a worm wheel mounted to be driven by said worm, said wheel having a generally frusto-conical shaped surface formed on one side, a spring pressure plate adjacent said surface in driving relation with said crank assembly, a synthetic resin disc disposed between said plate and said surface, and means acting between said plate and said wheel for securing the disc therebetween to form a driving connection between the wheel and the crank assembly, said disc permitting relative movement between the worm wheel and said plate when a predetermined overload is applied to the cutter mechanism.

2. The device set forth in claim 1 in which a first handle is mounted on said support in substantially axial alignment with said elongated cutter mechanism and a second handle is mounted on said support at an angle to the axis of said cutter mechanism and said first handle and disposed at a position corresponding substantially to the center of gravity of the cutter mechanism and the first handle and wherein said motor means is disposed in one of said handles.

3. In a trimmer for cutting hedges and the like, a cutting mechanism, a motor for driving said cutting mechanism having an air inlet and an air exhaust, means for causing air to move from said inlet to said outlet in response to operation of said motor, a driving connection between the cutting mechanism and said motor, a housing having a compartment for said driving connection and having a second compartment overlying said first compartment and defined by grillwork, said housing and motor being secured together whereby the air discharged from said motor passes into said second compartment and through said grillwork to cool the housing.

4. In a trimmer for cutting hedges and the like, the combination of a support, an elongated cutter mechanism comprising a comb projecting outwardly from said support, a blade mounted in side by side relation with said comb and a yoke mounted on one end of said blade, motor means for driving said blade mounted on the opposite end of said support, said motor having a shaft with a worm formed thereon in substantial parallel relation with the longitudinal axis of the cutter mechanism and disposed in the same plane as the yoke, a crank shaft mounted on said support and disposed at an angle to said latter plane, a worm wheel driven by said worm and drivingly mounted on said crank shaft to be disposed in the plane of the worm, an eccentric member mounted on said shaft adjacent said worm wheel and a connecting link having offset end portions disposed between said eccentric member and said yoke to transmit the rotational motion of the crank shaft to reciprocating motion in the blade.

IVAR JEPSON.

References Cited in the file of this patent

UNITED STATES PATENTS

| Number | Name | Date |
|---|---|---|
| 549,476 | Cladwell | Nov. 5, 1895 |
| 575,046 | Tunelius | Jan. 12, 1897 |
| 1,023,249 | Gales | Apr. 16, 1912 |
| 1,265,178 | Camborizou | May 7, 1918 |
| 1,346,245 | Palosky | July 13, 1920 |
| 1,458,250 | Staudinger | June 12, 1923 |
| 1,837,655 | Craft | Dec. 22, 1931 |
| 1,871,700 | Jeppsson et al. | Aug. 16, 1932 |
| 1,937,586 | Ortt | Dec. 5, 1933 |
| 2,005,862 | Johnsen | June 25, 1935 |
| 2,025,831 | Schellenger | Dec. 31, 1935 |
| 2,091,827 | Mercatoris | Aug. 31, 1937 |
| 2,184,781 | Ryan | Dec. 26, 1939 |
| 2,268,221 | Mischker | Dec. 30, 1941 |
| 2,401,796 | Raitch | June 11, 1946 |
| 2,599,292 | Steinbach et al. | June 3, 1952 |

FOREIGN PATENTS

| Number | Country | Date |
|---|---|---|
| 507,101 | France | Sept. 6, 1920 |
| 628,933 | France | July 11, 1927 |
| 871,260 | France | Apr. 17, 1942 |